United States Patent [19]
Chhuy et al.

[11] 3,773,523
[45] Nov. 20, 1973

[54] EDIBLE COMPOSITIONS AND PROCESSES FOR MAKING SAME

[75] Inventors: Lim Chheang Chhuy, Paris, France; Edgar Allen Day, Rumson, N.J.

[73] Assignee: International Flavors & Fragrances Inc., New York, N.Y.

[22] Filed: Apr. 26, 1971

[21] Appl. No.: 137,698

[52] U.S. Cl. .................. 426/167, 426/212, 426/222, 426/175, 426/203, 426/229, 426/364
[51] Int. Cl. .......................... A23l 1/26, A23l 1/325
[58] Field of Search ...................... 99/140 R, 140 N, 99/111, 112

[56] References Cited

UNITED STATES PATENTS

| | | | |
|---|---|---|---|
| 3,214,276 | 10/1965 | Sakakibara | 99/111 X |
| 3,481,748 | 12/1969 | Saruno | 99/140 R |
| 3,519,437 | 7/1970 | Giacino | 99/140 R |
| 3,627,540 | 12/1971 | Katz | 99/140 R |
| 3,645,754 | 2/1972 | Wiener | 99/140 R |
| 1,497,193 | 6/1924 | Nishio | 99/112 |
| 1,556,772 | 10/1925 | Endo | 99/112 |
| 1,642,209 | 9/1927 | Kahn | 99/112 X |
| 2,045,949 | 6/1936 | Hatta | 99/112 X |
| 2,077,533 | 4/1937 | Schmalfuss | 99/112 X |

OTHER PUBLICATIONS

P. Saisithi et al., J. Food Sci., 31(1), 105–110 (1966).

*Primary Examiner*—Morris O. Wolk
*Assistant Examiner*—Sidney Marantz
*Attorney*—Arthur L. Liberman et al. and Brooks, Haidt and Haffner

[57] ABSTRACT

Processes for imparting a seafood flavor to foodstuffs comprising adding thereto a small amount of (1) a processed product of (I) an algae extract or enzymatic digest of seafood or seafood extract or seashell extract, (II) a sulfur compound such as cysteine and, if desired (III) thiamine and/or thiazole alkanols and (IV) other free amino acids and/or polypeptides and, in addition, if desired (2) an oxazoline and/or 2,4-pentadienal and/or thiazole alkanols; as well as flavoring compositions and flavor enhancing compositions containing such processed products and optional materials and the foodstuffs so obtained.

16 Claims, No Drawings

EDIBLE COMPOSITIONS AND PROCESSES FOR MAKING SAME

This invention relates to flavoring foodstuffs, to compositions for flavoring foodstuffs, and to the products so obtained.

Much attention has been devoted to improving the flavor of foodstuffs, and particularly the flavors of meat products, fruits and confectionery. There is also a need to provide compositions and processes for improving the flavors of seafood, or for providing savory seafood flavors to foods containing no seafood or to seafood products having only a low level of flavor.

A substantial number of investigations have been carried out relating to reacting such materials as amino acids, hydrolyzed vegetable protein, sugars, sulfur-containing compounds (e.g. cysteine and hydrogen sulfide) and ribonucleotides in an effort to produce meaty tasting products or ingredients therefor. Thus, for example, the following publications set forth such reaction products and methods for preparing same:

| PUBLICATION | REACTANTS |
|---|---|
| 1. U.S. Pat. 2,934,437 | Cysteine and sugars |
| 2. U.S. Pat. 3,532,514 | Cysteine, sugar, fatty acid material |
| 3. Belgian Pat. 740,221 | Reducing sugar and fish product extract |
| 4. U.S. Pat. 3,394,015 | Sulfur-containing compound and hydrolyzed vegetable protein (sugar-free) |
| 5. U.S. Pat. 3,394,016 | Thiamine and an aliphatic carboxylic acid |
| 6. German Offen. 1,932,800 | Hydrogen Sulfide and a 4-hydroxy2,3-dihydrofuran-3-one |
| 7. U.S. Pat. 2,918,376 | Fish Protein hydrolyzate and cysteine |
| 8. U.S. Pat. 2,887,387 | Fish Protein hydrolyzate and saccharide |

However, none of the references, disclosing processed materials, discloses the production of any type of seafood flavor.

THE INVENTION

This invention relates to edible compositons and their production. The products are characterized by their fish-like flavor. They may have food and /or aroma value per se, and may be used as such or in the preparation of soups, gravy and other food products to enhance the flavor thereof.

It is an object of this invention to provide edible compositions having a seafood-like flavor and aroma and to do so by simple and efficient processes.

The invention comprises the novel products as well as the novel processes and steps of processes according to which such products are manufactured, the specific embodiments of which are described hereinafter by way of example, and in accordance with which we now prefer to practice the invention.

In accordance with this invention edible compositions are prepared comprising the product of the processing of a natural seafood extract or an enzymatic digest of seafood or a seashell extract or an algae extract with at least one sulfur-containing compound, more particularly defined below; in the absence of a sugar and, optionally, in the presence of thiamine, thiamine precursors which are thiazole derivatives such as those described in copending U.S. Pat. application No. 866,-399 filed Oct. 14, 1969, now U.S. Pat. No. 3,681,088, and other free amino acids and polypeptides.

The terms "processing" and "processed" are herein intended to mean a series of steps including intimately admixing and (1) heating as for example in cooking and/or (2) aerating and/or (3) application of supra-ambient pressures as in canning.

"Sulfur-containing compounds" may be sulfur-containing amino acids, liberating hydrogen sulfide, or may be lower alkyl mercaptans, or lower alkyl sulfides, or lower alkyl disulfides or may be an inorganic sulfur compound, or hydrogen sulfide itself, each of which is adapted to liberate a flavor under heating. Such inorganic sulfur compounds are designated herein as having the formula $MS_x$, where M is selected from the group consisting of an alkali metal, an alkaline earth metal and ammonium and $S_x$ is selected from the group consisting of sulfide, and sulfhydrate.

When hydrogen sulfide or a lower alkyl mercaptan is used it is necessary to control the amounts used so as to avoid overpowering the aroma of the product with the aroma of the mercaptan or the hydrogen sulfide. The lower alkyl mercaptans and sulfides preferably contain one to six carbon atoms. The lower alkyl disulfides preferably contain one to three carbon atoms.

Cysteine, cystine and methionine are mentioned especially as preferred sulfur-containing amino acids. Especially preferred products resembling natural seafood in their flavor and aroma are produced by means of intimately admixing and heating mixtures of cysteine and/or methionine and/or their salts with seashell extracts and/or enzymatic digest of seafood and/or seafood extracts and/or algae extracts.

By the term "seafood extract" is meant a concentrated or unconcentrated extract of an edible seafood which may, if desired, be a raw seafood meat or a dehydrated and pulverized seafood meat or a previously processed seafood such as spray dried mollusk meat as described in U.S. Pat. No. 3,529,975 issued on Sept. 22, 1970. Specific examples of edible seafoods which may be so extracted are the meats of mollusks and vertebrates such as lobster meat, oysters, crabs, crawfish, anchovies, menhadden, flounder, shrimp and tuna. The extraction operation used may be batch, semicontinuous or continuous. Examples of extraction solvents are water, aqueous solutions of non-toxic salts such as sodium chloride, fluorinated hydrocarbons including those of the "Freon" series, methyl ethyl ketone, methylene dichloride and ethylene dichloride. The extraction temperatures and pressures vary from 0° C and one atmosphere up to reflux temperatures and pressures, e.g. 100° C and 1 atmosphere in the case of water. The residence time of extraction (including recycle residence times) is dependent on average solid particle size, extraction temperature, pressure and solvent and varies from one-half hour up to 5 days.

By the term "seashell extract" is meant a concentrated or unconcentrated extract of pulverized seashells including such seashell varieties as mussel shells, oyster shells, snail shells and chitinous shell structures such as shell of shrimp, lobster and crawfish. Examples of extraction solvents are water, aqueous solutions of non-toxic salts such as NaCl and KCl, methyl ethyl ketone, methylene dichloride and ethylene dichloride. The extraction temperature and pressure are preferably from 10° C and 1 atomosphere up to reflux temperatures and pressures; e.g. 100° C and 1 atmosphere in the case of water. The residence time of extraction (including recycle residence times) is dependent on average solid particle size, extraction temperature, pressure and solvent and varies from one-half hour up to 5 days.

By the term "algae extract" is meant a concentrated or unconcentrated extract of dried and powdered macroscopic algae such as that of the "Rhodomelaceae" family, that of the "Laminariaceae" family and that of the "Phaeophyta" family and microscopic algae such as Chorella pyrenoidosa (Emerson strain). Various extraction techniques known in the prior art may be used such as that set forth in Japanese Pat. Nos. 70/40271 published on Dec. 17, 1970 and 20137/68 published Aug. 29, 1968. Examples of extraction solvents are water, ethanol, aqueous water-ethanol mixtures, ethylmethyl ketone and ethylene dichloride. The extraction temperatures and pressures vary from 20° C and 1 atmosphere up to reflux temperatures and pressures, e.g. 95° C and 1 atmosphere for a 50—50 ethanol-water mixture. The residence time of extraction (including recycle residence times) is a function of the average solid particle size, extraction temperature, extraction pressure, and solvent and varies from one-half hour up to 10 days.

By the term "enzymatic digest of seafood" is meant a material produced by allowing layers of salt (e.g. NaCl) and raw fish to become enzymatically and anaerobically digested over a substantial period of time, for example one year.

Each of the above-named extracts or enzymatic fish digests may contain some free amino acids together with various protein derivatives such as proteases, peptones, polypeptides and dipeptides. Among the proteins which may be included in these extracts are globulins, gluteline, prolamines, albuminoids, histones, protamines, nucleoproteins, glycoproteins, phosphorproteins, chromoproteins and lipoproteins.

Additional flavor nuances may be introduced into the product of the invention by incorporating into the process mass, prior to or subsequent to termination of the process, (1) thiazole derivatives such as, for example, thiamine HCl, and 4-methyl-5-($\beta$-hydroxyethyl) thiazole and/or (2) free amino acids such as alanine, leucine, valine and glutamic acid and/or various polypeptides including dipeptides and tripeptides.

Still other useful flavor nuances may be introduced into the product after processing by the use of pentadienal and/or various oxazolines and/or thiazole alkanols such as 4-alkyl-5-($\beta$-hydroxyalkyl) thiazole wherein the alkyl groups may contain up to five carbon atoms.

The products of the invention, as exemplified in the examples below, all have seafood flavors and aromas.

The quantity of processed material utilized in the practice of this invention can be varied to provide a wide range of seafood-type flavors. As used herein, "seafood-like flavors" will be understood to mean flavors associated with marine animals including crustaceans such as shrimp, lobster and the like; mollusks such as oysters, clams, and the like; and particularly fish including smoked fish, dried fish, salted fish, and the like. Thus, at levels as low as 0.1 percent, the processed material begins to impart a very light, almost indefinable, sensation in aqueous solution. As the level is increased to 0.2 percent a definite pleasant seafood-like character is imparted to an aqueous solution. As the level reaches 0.5 percent a definite, good characteristic fish-like flavor and aroma is obtained and this flavor persists up through levels of 2 percent and beyond, where the substance leaves a light, lingering aftertaste. All parts, proportions, percentages and ratios herein are by weight unless otherwise indicated.

The processed material can be added in pure form or in processed mixtures containing it. The processed material can readily be prepared under a number of reaction conditions. It will be understood by those skilled in the art, that regardless of the purity of the reactants used, they should contain no noxious or noisome components which would interfere with the flavor conferred on foodstuffs or on its safety for use in edible materials.

It is contemplated herein that foodstuffs flavored according to this invention include both solid and liquid preparations for oral consumption by human beings and by animals, particularly warm-blooded domestic animals such as are used for pets or raised for consumption.

The products of the invention may be provided as dry solids, in liquid mixtures or in pastes. Preferably, they are prepared by heating aqueous or fatty mixtures of the selected components. The resulting liquid products may be used as such, or they may be concentrated for use. If solid products are desired, the same may be obtained by drying the liquid mixtures. The aqueous compositions are dehydrated by spray drying, although drum, freeze and other drying procedures are applicable. A solid carrier is often added to the liquid mixture before drying.

According to the preferred process of this invention the ingredients are taken up with water or a fatty material such as hydrogenated coconut oil and the mixture heated. Although the time, temperature and pressure are not critical, if refluxing is used, it is most convenient to reflux the aqueous mixture at atmospheric pressure for a period of from 3 to 5 hours. Longer periods may be used at less than reflux temperature, and shorter periods may be used when the treatment is carried out under pressure greater than atmsopheric (for example, 2–15 atmospheres), at higher than reflux temperature. When higher pressures are used the sharpness and flavor intensity will be increased. During reflux or heating, as above, the processed product is formed.

The best properties of the compositions are often brought out by permitting the composition to age for a period of from 2 to 4 days after the heat treatment. Aging is not essential, however.

A large weight excess of water or other reaction media, e.g. beef fat or fish oil is preferably used in preparing the liquid compositions of this invention, although such excess is not essential. Varying amounts of water or fat or fish oil, for example, from about 1:1 to about 10:1 by weight, based on the total weight of the remainder of the mixture, can be used. In the case of aqueous mixtures, after heat treatment, and aging, if desired, the water can be at least partially evaporated to provide more concentrated liquid compositions; or fully evaporated to produce solid, edible compositions.

As aforesaid, compositions resembling natural seafood products in their flavor and aroma are produced from mixtures containing sulfur compounds such as methionine or cysteine or cystine and a natural seafood extract or enzymatic digest of seafood or natural seashell extract or natural algae extract. The most useful of these products are obtained from mixtures containing one or more of these acids together with thiamine, suitably as an acid salt, and a natural seafood extract or an enzymatic digest of seafood or a natural seashell extract or a natural algae extract.

Many algae, seafood and seashell extract materials are available which are useful for the preparation of the compositions of this invention. These include natural extract of Corsican Moss, produced by "Les Bons Producteurs" of Dijon, France; "oyster extract," produced by Kyowa Hakko Kogyo Co., Ltd., Chiyoda-ku, Tokyo, Japan, extracts produced by extracting shrimp, lobsters, crabs, menhadden, catfish; fish oil and fish extract products produced according to the process set forth by Swendsen, "Chemical Engineering" pages 176–8, Apr. 10, 1967; or by Southwestern Engineering Co. as disclosed in French Pat. No. 1,540,106 issued on Sept. 25, 1968.

The amount of seafood extract or seashell extract or algae extract or enzymatic digest of seafood used in our compositions prior to processing may vary within wide limits. For example, liquid compositions may be prepared using as little as 1 percent by weight or as much as 40 percent by weight of seafood meat extract or algae extract or seashell extract or enzymatic digest of seafood based on the total weight of the composition. We prefer to use dehydrated seafood or seashell or algae or enzymatic seafood digest product for preparing our compositions to obtain the best flavors. We also prefer to extract the seafood or seashell or algae materials with solvents which can easily be separated from the desired extracts. Examples of such extracting solvents are water, alcohols, methylene dichloride, ethylene dichloride, methyl isobutyl ketone, glycols such as propylene glycol and aqueous saline solutions such as 5 percent NaCl.

When it is used, thiamine may be used as a free base, but is preferably employed as an acid salt. The preferred salts are halogen acid salts and, of these, the hydrochloride is especially suitable. The amount of thiamine used in the preparation of seafood flavors whether as the free base or as the acid salt generally varies from about 0.2 percent to about 20 percent, by weight, based on the total weight of the liquid composition, although useful products may be prepared with greater or lesser amounts.

Cysteine and cystine are sulfur-containing amino acids readily available as free amino acids or as salts, both acid and basic. Preferably, the acid salts, especially the halogen acid salts, such as the hydrochloride are utilized. For most purposes the desired flavor quality is achieved by the use of from about 0.2 percent to about 20 percent by weight of each of these amino acids as free acids or as salts, or a combination of them totaling the same proportion by weight based on the total weight of the liquid composition. Useful products may be obtained using somewhat greater or lesser amounts.

The inorganic sulfur-containing compounds include sodium sulfhydrate and sodium sulfide. Instead of sodium compounds, corresponding compounds of potassium, calcium and ammonium or substituted ammonium may be substituted. Any such compound employed should be capable of reacting to give the desired seafood note.

Organic sulfur-containing compounds useful in the practice of this invention include methyl mercaptan, ethyl mercaptan and propyl mercaptan, dimethyl sulfide, dimethyl disulfide, and methyl ethyl sulfide.

Useful products can be obtained using somewhat greater or lesser amounts than previously indicated of the sulfur-containing amino acid or acids, but it should be understood that the preferred amounts of sulfur-containing amino acid in the compositions as defined above are over and above the amounts of these acids or any of them which may be present either free or combined in any of the seafood, seashell or algae extracts or the enzymatic fish digest.

Varying amounts of other ingredients can be employed to impart special notes to the food compositions. Phenylalanine imparts a desirable sweet tangy note and 2,4,5-trimethyl-$\Delta^3$-oxazoline and 2,4-pentadienal cooked fish notes.

The compositions of this invention can be employed as liquids, i.e., dispersions or solutions, or as dried products. Drying may be accomplished by any convenient method. Spray drying is particularly effective.

We have found that carriers are useful in extending the flavor of our products when prepared and utilized as dry compositions. These carriers do not appreciably diminish the quality of the flavor, but they stabilize it and increase the shelf life of the product. Polysaccharides such as gum arabic are useful, as are mixtures or salts and suitable carbohydrates such as karaya, tragacanth or carboxyl methyl cellulose and the like.

In a preferred process, an aliquot of the liquid composition is dried and the flavor solids content of the composition determined. An amount of carrier substantially equal to the calculated solids content of the liquid composition is added thereto and the mixture dried, preferably by spray drying. Alternatively, an amount of carrier substantially equal to the weight of the original dry ingredients is added to the liquid composition after reaction of the ingredients, and then dried. The preferred amounts of carrier are from about 0.5:1 to about 2:1, based on the solids content of the liquid mixture.

The following examples of edible substances illustrate the manner in which we now prefer to practice our invention. It is to be understood that this invention is not to be considered as limited thereto, except as indicated in the appended claims. In the examples, the various ingredients are listed in parts by weight.

Examples A,B,C,D,E,F and G illustrate the manner in which we now prefer to produce seafood extract or seashell extract or algae extract or enzymantic fish digest useful in the processes which are carried out in order to produce the edible substances of our invention.

EXAMPLE A

To 75 gms. of dehydrated seashells [25:25:50 (weight ratio) shrimp shell — lobster shell — mussel shell finely ground mixture] is added a mixture of 25 gms. of sodium chloride and 100 gms. of water. The resulting slurry is refluxed at atmospheric pressure for a period of 1 hour. The resulting slurry is filtered and the presscake is refluxed for 1-½ hours again with a mixture of 75 gms. of water and 18.75 gms. of sodium chloride. The supernatant liquid batches resulting from the above mentioned first and second filtrations are then combined to form a "natural seashell extract."

EXAMPLE B

To 75 gms. of dehydrated lobster meat is added a mixture of 25 gms. of sodium chloride and 100 gms. of water. The resulting slurry is refluxed at atmospheric pressure for a period of 1 hour. The resulting slurry is filtered and the press cake is refluxed for 1-½ hours again with a mixture of 75 gms. of water and 18.75 gms. of sodium chloride. The supernatant liquid batches resulting from the above mentioned first and second filtrations are then combined to form a "natural seafood extract."

EXAMPLE C

To 75 gms. of dehydrated pulverized shrimp is added a mixture of 25 gms. of sodium chloride and 100 gms. of water. The resulting slurry is refluxed at atmospheric pressure for a period of 1 hour. The resulting slurry is filtered and the press cake is refluxed for 1-½ hours again with a mixture of 75 gms. of water and 18.75 gms. of sodium chloride. The supernatant liquid batches resulting from the above mentioned first and second filtrations are then combined to form a "natural seafood extract."

EXAMPLE D

To 75 gms. of dehydrated pulverized dried seaweed [a 50—50 mixture of red algae and brown algae (Rhodophyta and Phaeophyta)] is added a mixture of 25 gms. of sodium chloride, 100 gms. of water and 150 gms. of methylene dichloride. The resuting slurry is refluxed at atmospheric pressure for a period of 1 hour. The resulting slurry is filtered and the presscake is refluxed for 1-½ hours again with a mixture of 75 gms. of water, 18.75 gms. of sodium chloride and 100 gms. of ethylene dichloride. The supernatant liquid batches resulting from the above mentioned first and second filtrations are then vacuum evaporated to one-fourth of their original volumes, removing the ethylene dichloride and methylene dichloride, and then combined to form a "natural algae extract."

EXAMPLE E

To 75 gms. of dehydrated chopped and pulverized anchovies is added a mixture of 25 gms. of sodium chloride and 100 gms. of water. The resulting slurry is refluxed at atmospheric pressure for a period of 1 hour. The resulting slurry is filtered and the press cake is refluxed for 1-½ hours again with a mixture of 75 gms. of water and 18.75 gms. of sodium chloride. The supernatant liquid batches resulting from the above mentioned first and second filtrations are then combined to for a "natural seafood extract."

[Alternatively this material can be replaced by Anchovy Extract produced by Unilever, N.V. of Rotterdam, Netherlands.]

EXAMPLE F

An enzymatic fish digest is produced by intimately admixing twelve pounds of sardines having an average length of 6 inches with 4 pounds of finely ground sodium chloride. The resulting mixture is transferred to a fermentation tank maintained at a temperature at the range of 35°–45° C. The tank is then sealed and the fermentation batch is allowed to stand for a period of 10 months. The fermentation slurry is then decanted and the resuting decanted slurry is filtered through a sand filtration bed. The resulting filtrate is then transferred to an earthenware container and ripened in the sun for 2 months. One pound of product ("Nuoc-mam") is produced for every 6 pounds of sardine used.

A material closely similar to the product produced according to the foregoing procedure is available from Ets. Tak Heng & Cie. 47, rue Monsieur Le Prince — 75/Paris VIeme. The materials set forth below are substantially identical to the "Nuoc-mam" produced as indicated above:

| Location | Name of Product |
|---|---|
| Cambodia | Tuk-trey |
| Thailand | Nam-pla |
| Philippines | Patis |
| Indonesia | Ketjap-ikan |
| Burma | Ngapi |

A process for producing a substantially identical product is set forth in detail in a paper by V. Uyenco and I. Lewis, 1952, Mechanics of Bagoong and Patis processing; Indo-Pacific Fishery Conf., 4th Proc.

"Tuk-trey" production is disclosed in DA Pam. No.5-50-50 "Area Handbook for Cambodia" April 1963, Superintendent of Documents — U.S. Government Printing Office.

"Nam-pla" production is disclosed in an article by Saisithi et al., entitled "Microbiology and Chemistry of Fermented Fish" at pages 105–110 of the Journal of Food Science Vol. 31, Number 1, 1966.

EXAMPLE G

To 10 kg of finely ground dried Corsican Moss Algae (Helminthochorton of the Rhodomelaceae family) are added 10 kg of 95 percent aqueous ethyl alcohol. The slurry is stirred in a blender for 72 hours at a temperature in the range of 55°–60° C. The slurry is then filtered and the presscake is re-extracted twice with equal weights of 95 percent ethanol, batchwise, 72 hours per extraction at 55°–60° C. The two press-cake extracts are combined and concentrated at atmospheric pressure to one-fourth of their original volumes. The concentrated presscake extract is then combined with the original extract, thereby forming a "natural algae extract."

Examples I–XXV set forth processes for producing edible flavoring substances and food compositions containing said edible flavoring substances, and thus illustrate the manner in which we now prefer to practice our invention.

EXAMPLE I

The following ingredients are refluxed for 4 hours. The resulting mixture is then aged for 3 days and an aliquot withdrawn and dried. Based on the weight of the dry solid product obtained, sufficient gum arabic is added to the batch to provide a composition containing one part by weight of flavor solids and one part by weight of gum arabic. The composition is then spray dried to produce a seafood flavored product:

| | |
|---|---|
| L-cysteine hydrochloride | 0.88 |
| Seashell extract produced in Example A | 98.24 |
| Thiamine hydrochloride | 0.88 |

EXAMPLE II

The following ingredients with the exception of 95 percent ethyl alcohol are refluxed for 3 hours. The mixture is cooled and the alcohol is added. The liquid product obtained thereby has an intense seafood flavor:

| | |
|---|---|
| L-cysteine hydrochloride | 5.44 |
| Thiamine hydrochloride | 5.06 |
| Seafood Extract Produced | 15.19 |

| | |
|---|---|
| by the Process of Ex. B | |
| Water | 50.05 |
| Palmitic acid | 0.35 |
| Glutamic acid | 0.53 |
| Potassium chloride | 0.44 |
| Dibasic potassium phosphate | 0.35 |
| Dibasic ammonium phosphate | 2.11 |
| Phosphoric acid | 0.30 |
| Calcium lactate | 0.18 |
| 95% Ethyl alcohol | 20.00 |

EXAMPLE III

The following ingredients are admixed to form a fish soup concentrate:

| | |
|---|---|
| Dehydrated fish in powder form | 10 |
| Salt (NaCl) | 10.4 |
| Tetramethyl pyrazine | 2 |
| Whale extract | 1 |
| Yeast extract | 0.2 |
| Hydrogenated fat | 5 |
| Lactose | 0.8 |
| Corn starch | 10 |
| Wheat flour | 18 |
| Non-fat milk solids | 10 |
| Dehydrated carrot in pieces | 4 |
| Dehydrated onion in pieces | 0.4 |
| Dehydrated celery in pieces | 0.2 |
| Tumeric powder | 0.2 |
| Tomato powder | 8 |
| Paprika powder | 1 |
| Onion powder | 1.2 |
| Saffron powder | 0.02 |
| Pepper powder | 0.5 |
| Fennel powder | 0.4 |
| Seafood Flavor Produced by the Process of Ex. II | 10 |

To this concentrate is added 1 liter of water having a temperature of 85° C. The mixture is then brought to reflux and stirred for a period of ten minutes. A very flavorful fish soup is thereby produced.

EXAMPLE IV

The following ingredients are refluxed for 2 hours to produce a product resembling oyster in flavor:

| | |
|---|---|
| Dibasic ammonium phosphate | 1.01 |
| Tetramethyl pyrazine | 0.84 |
| Beta alanine | 0.84 |
| Glycine | 0.51 |
| Palmitic acid | 0.34 |
| Betaine | 0.34 |
| Ascorbic acid | 0.17 |
| Choline chloride | 0.17 |
| Seashell Extract Produced by the Process of Ex. A | 10.08 |
| L-Cysteine hydrochloride | 0.26 |
| Thiamine hydrochloride | 0.05 |
| Water | 85.39 |

EXAMPLE V

The following ingredients are admixed to form an oyster-flavored concentrate:

| | |
|---|---|
| Tomato paste (28% solids) | 125 |
| Peanut oil | 25 |
| Sugar powder | 12 |
| Salt powder | 18.2 |
| Tetramethyl pyrazine | 2 |
| Corn starch | 15 |
| Wheat flour | 10 |
| Natural whale extract | 1 |
| Pepper powder | 0.5 |
| Garlic powder | 0.5 |
| Dehydrated fish powder | 10 |
| Yeast extract | 0.2 |
| Non-fat milk solids | 10 |
| Papriku powder | 0.5 |
| Onion powder | 1.2 |
| Suffron powder | 0.02 |
| Fennel powder | 0.5 |
| Oyster Flavor Produced by the Process of Ex. IV | 15 |

EXAMPLE VI

The following ingredients are refluxed for 5 hours, aged for 3 days admixed in 1:1 ratio with gum arabic and spray dried to produce a product having a seafood-like flavor:

| | |
|---|---|
| L-Cysteine hydrochloride | 1.75 |
| Seafood Extract Produced by the Process of Ex. B | 29.31 |
| Beta alanine | .50 |
| Thiamine hydrochloride | 1.75 |
| Water | 66.69 |

EXAMPLE VII

The following ingredients are refluxed for 4 hours, aged for 3 days admixed in 1:1 ratio with gum arabic and spray dried to produce a dry solid having a seafood flavor. Before spray drying one part of sodium chloride is added.

| | |
|---|---|
| L-Cysteine hydrochloride | 1.71 |
| Seafood Extract Produced by the Process of Ex. C | 28.63 |
| Thiamine hydrochloride | 1.71 |
| Water | 67.95 |

EXAMPLE VIII

The following ingredients are refluxed for 4 hours, aged for 3 days and spray dried to produce a solid product having a baked fish flavor. Before drying sufficient gum arabic is added to provide a composition containing 0.5 parts gum arabic and 1 part flavor solids.

| | |
|---|---|
| L-Cysteine hydrochloride | 1.32 |
| Seafood Extract Produced by the Process of Ex. B | 44.05 |
| Thiamine hydrochloride | 1.32 |
| Beta Alanine | .50 |
| Water | 53.31 |

EXAMPLE IX

The following ingredients are refluxed for 4 hours, aged 3 days and spray dried to produce a dried product having a seafood flavor:

| | |
|---|---|
| Water | 53.74 |
| Dibasic ammonium phosphate | 1.06 |
| Thiamine hydrochloride | .63 |
| L-cysteine hydrochloride | .27 |
| Potassium chloride | .27 |
| Phosphoric acid (85%) | .21 |
| Dibasic potassium phosphate | .21 |
| Calcium lactate | .10 |
| Salt | 5.30 |
| Beef fat | 21.20 |
| Seashell Extract Produced by the Process of Ex. A | 17.54 |

EXAMPLE X

The following ingredients are refluxed for 3 hours, aged for 3 days and spray dried using sufficient gum arabic to provide a composition containing one part of gum arabic and one part flavor solids. The resulting dry product has a flavor closely resembling that of natural seafood:

| | |
|---|---|
| L-Cysteine hydrochloride | 0.66 |
| Seafood Extract Produced by the Process of Ex. B | 23.20 |
| Thiamine hydrochloride | 0.66 |
| Water | 78.48 |

EXAMPLE XI

The following ingredients are refluxed for 3 hours and thereafter sufficient gum arabic added to provide a composition having one part by weight gum arabic and one part by weight flavor solids. The composition is spray dried to produce a product having a flavor resembling that of natural crab meat:

| | |
|---|---|
| Dibasic ammonium phosphate | 1.28 |
| Tetramethyl pyrazine | 1.07 |
| Potassium chloride | 0.27 |
| Phosphoric acid | 0.22 |
| Dibasic potassium phosphate | 0.22 |
| Calcium lactate | 0.11 |
| Menhadden Oil | 3.43 |
| Ammonium bicarbonate | 1.07 |
| DL-Methionine | 3.22 |
| Water | 83.66 |
| Seashell Extract produced by the process of Ex. A | 8.55 |

EXAMPLE XII

The following ingredients are refluxed for 2 hours and thereafter sufficient gum arabic added to provide a composition containing two parts gum arabic and one part flavor solids by weight. The composition is spray dried to produce a dry product with a flavor resembling that of natural steamed oysters:

| | |
|---|---|
| Dibasic ammonium phosphate | 0.81 |
| Tetramethyl pyrazine | 0.67 |
| Beta alanine | 0.67 |
| Glycine | 0.41 |
| Seafood Extract Produced by the Process of Ex. B | 15.00 |
| Dibasic potassium phosphate | 0.14 |
| Potassium chloride | 0.14 |
| Glutamic acid | 0.28 |
| L-Cysteine hydrochloride | 2.21 |
| Thiamine hydrochloride | 2.21 |
| Water | 69.80 |

EXAMPLE XIII

The following ingredients are refluxed for 2 hours and sufficient gum arabic added to provide a composition containing one part gum arabic and one part flavor solids by weight. The composition is drum dried to produce a dry product with a flavor resembling that of fresh flounder:

| | |
|---|---|
| L-cysteine hydrochloride | 2.00 |
| Thiamine hydrochloride | 2.00 |
| Water | 67.00 |
| Seafood Extract produced by the Process of Ex. B | 29.00 |

EXAMPLE XIV

The following ingredients are refluxed for 4 hours and sufficient gum arabic added to provide a composition containing one part gum arabic and one part flavor solids by weight. The composition is spray dried to produce a product with a flavor resembling that of natural shrimp:

| | |
|---|---|
| L-Cysteine hydrochloride | 0.88 |
| Thiamine hydrochloride | 0.88 |
| Water | 67.30 |
| Seashell Extract produced by the Process of Ex. A | 30.94 |
| 4-methyl-5(β-hydroxyethyl) thiazole | 0.95 |

EXAMPLE XV

The following ingredients are refluxed for 4 hours and sufficient gum arabic added to provide a composition containing one part gum arabic and one part flavor solids by weight. The composition is spray dried to produce a product with a flavor resembling that of lobster:

| | |
|---|---|
| Sodium sulfide | 0.15 |
| L-Cysteine hydrochloride | 0.77 |
| Thiamine hydrochloride | 0.88 |
| Water | 67.46 |
| Seashell Extract Produced by the Process of Ex. A | 30.94 |

EXAMPLE XVI

The following ingredients are refluxed for 4 hours:

| | |
|---|---|
| Sodium sulfhydrate | 0.88 |
| Thiamine hydrochloride | 0.88 |
| Seafood Extract produced by the process of Ex. C | 30.94 |
| Water | 67.30 |

The composition is spray dried to produce a product with a seafood flavor.

EXAMPLE XVII

The following ingredients are refluxed for 2 hours:

| | |
|---|---|
| Sodium sulfhydrate | 0.88 |
| Thiamine hydrochloride | 0.88 |
| Water | 67.30 |
| Seafood Extract produced by the process of Ex. B | 30.94 |

The composition is spray dried to produce a product with a seafood flavor.

EXAMPLE XVIII

The following ingredients are refluxed for 2 hours:

| | |
|---|---|
| Sodium sulfide | 0.88 |
| Thiamine hydrochloride | 0.88 |
| Water | 67.30 |
| Seafood Extract produced by the process of Ex. C | 30.94 |

The composition is spray dried to produce a product with a seafood flavor.

In order to give a cooked note to the seafood flavors in the above Examples to produce flavors which suggest cooked products, we have found that such notes may be produced by adding mixtures of 2,4,5-trimethyl-$\Delta^3$- oxazoline and pentadienal. As examples of this we give the following:

EXAMPLE XIX

The following ingredients are refluxed for 4 hours:

| | |
|---|---|
| L-cysteine hydrochloride | 0.88 |
| Thiamine hydrochloride | 0.88 |
| Seafood Extract produced by the Process of Ex. B | 31.00 |
| Water | 67.00 |

Subsequent to the refluxing operation, the following ingredients are added with stirring:

| | |
|---|---|
| 2,4,5-trimethyl-$\Delta^3$-oxazoline | 0.50 |
| Pentadienal | 0.50 |

The composition is then spray dried to produce a product with a seafood flavor with a cooked type note.

EXAMPLE XX

The following ingredients are refluxed for 4 hours:

| | |
|---|---|
| L-Cysteine hydrochloride | .88 |
| Thiamine hydrochloride | .88 |
| Water | 67.00 |
| Seafood Extract Produced by the Process of Ex. C | 31.00 |

Subsequent to the refluxing, the following ingredients are added with stirring:

| | |
|---|---|
| 2,4,5-trimethyl-$\Delta^3$-oxazoline | 0.12 |
| Pentadienal | 0.12 |

The composition is spray dried to produce a product with a fish flavor with a "baked fish" type note.

EXAMPLE XXI

The following ingredients are refluxed for 2 hours and sufficient gum arabic added to provide a composition containing one part gum arabic and one part flavor solids by weight. The composition is drum dried to produce a dry product with a flavor resembling that of fresh flounder:

| | |
|---|---|
| L-Cysteine hydrochloride | 2.00 |
| Thiamine hydrochloride | 2.00 |
| Water | 67.00 |
| Algae Extract Produced by the Process of Ex. D | 29.00 |

EXAMPLE XXII

The following ingredients are refluxed for 4 hours:

| | |
|---|---|
| L-Cysteine hydrochloride | 0.88 |
| Anchovy Extract Produced by the Process of Ex. E | 18.00 |
| Thiamine hydrochloride | 0.88 |
| Water | 67.30 |

The resulting mixture is then aged for 3 days and an aliquot portion is withdrawn and dried. Based on the weight of the dry solid obtained, sufficient gum arabic is added to the batch to provide a composition containing one part by weight of gum arabic. The composition is spray dried to produce a fish-flavored product.

EXAMPLE XXIII

The following ingredients are refluxed for 4 hours:

| | |
|---|---|
| L-Cysteine hydrochloride | 0.88 |
| Thiamine hydrochloride | 0.88 |
| "Nuoc-mam" [Enzymatic digest of fish produced by the process of Ex. F] | 32.00 |
| Water | 67.30 |

The resulting mixture is then aged for 3 days and an aliquot portion is withdrawn and dried. Based on the weight of the dry solid obtained, sufficient gum arabic is added to the batch to provide a composition containing one part by weight of gum arabic. The composition is spray dried to produce a fish-flavored product.

EXAMPLE XXIV

The following ingredients are refluxed for 5 hours at 2 atmospheres pressure:

| | |
|---|---|
| L-Cysteine hydrochloride | 1.8 |
| Thiamine hydrochloride | 1.8 |
| Algae Extract Produced by the Process of Ex. G | 3.0 |
| Water | 35.0 |
| Hydrogenated Coconut oil (Cobee 92° produced by Drew Chemical Co.) | 40.0 |

The resulting two phases are separated by means of decantation and the oil layer is aged for 3 days. A 50 percent aqueous gum arabic solution is added to the oil layer and the mixture is then homogenized and spray dried to provide a composition containing one-fourth part by weight of oil and three-fourths part by weight of gum arabic. The composition has an excellent fish flavor and may be used for flavoring dried soups, gravies and sauces.

EXAMPLE XXV

The following ingredients are admixed to form a fish soup concentrate:

| | |
|---|---|
| Salt (NaCl) | 10.4 |
| Tetramethyl pyrazine | 2 |
| Whale extract | 1 |
| Yeast extract | 0.2 |
| Hydrogenated fat | 5 |
| Lactose | 0.8 |
| Corn starch | 10 |
| Wheat flour | 18 |
| Non-fat milk solids | 10 |
| Dehydrated carrot in pieces | 4 |
| Dehydrated onion in pieces | 0.4 |
| Dehydrated celery in pieces | 0.2 |
| Tumeric powder | 0.2 |
| Tomato powder | 8 |
| Paprika powder | 1 |
| Onion powder | 1.2 |
| Saffron powder | 0.02 |
| Pepper powder | 0.5 |
| Fennel powder | 0.4 |
| Seafood Flavor Produced by the Process of Ex. XXIV | 10 |

To this concentrate is added 1 liter of water having a temperature of 85° C. The mixture is then brought to reflux and stirred for a period of ten minutes. A very flavorful fish soup is thereby produced.

We claim:

1. A process for preparing an edible composition comprising intimately admixing (1) a material selected from the group consisting of algae extract, seafood extract, enzymatic digest of fish and seashell extract with (2) a sulfur containing compound selected from the group consisting of a sulfur-containing amino acid, a lower alkyl mercaptan, a lower alkyl sulfide, a lower alkyl disulfide, hydrogen sulfide and an inorganic sulfur compound having the formula $MS_x$, where M is selected from the group consisting of alkali-metals, alkaline-earth metals and ammonium, and $S_x$ is selected from the group consisting of sulfide and sulfhydrate and heating the resulting mixture for a finite period of time; whereby a seafood flavor product is formed.

2. A process as defined in claim 1, wherein the products of the process are concentrated, aged and combined with a material selected from the group consisting of solvents, thickeners, carriers, extenders and flavor and aroma-imparting ingredients.

3. The process of claim 1, wherein the heating step comprises refluxing the resulting mixture for a period of time of from about 3 hours up to about 5 hours at atmospheric pressure.

4. The process for the production of an edible composition of claim 1 which comprises intimately admixing an aqueous mixture of a sulfur-containing amino acid and a seafood extract.

5. An edible composition produced by the process of claim 4.

6. A process for preparing an edible composition comprising intimately admixing (1) a material selected from the group consisting of seafood extract, seaweed extract, enzymatic digest of fish and seashell extract, (2) an acid salt of thiamine and (3) a sulfur-containing compound selected from the group consisting of a sulfur-containing amino acid, a lower alkyl mercaptan, a lower alkyl sulfide, a lower alkyl disulfide, hydrogen sulfide and an inorganic sulfur compound having the formula $MS_x$, where M is selected from the group consisting of alkali-metals, alkaline-earth metals, and ammonium, and $S_x$ is selected from the group consisting of sulfide and sulfhydrate and heating the resulting mixture for a finite period of time whereby a seafood flavor product is formed.

7. A process as defined in claim 6, wherein the products of the process are concentrated, aged, and combined with an additional material selected from the group consisting of solvents, thickeners, carriers, extenders, flavor and aroma-imparting ingredients.

8. An edible composition produced by the process of claim 7.

9. The process for the production of an edible composition of claim 6, wherein the sulfur-containing compound is cysteine.

10. An edible composition produced by the process of claim 9.

11. A process for the production of an edible composition of claim 6, which includes the further step of adding gum arabic to the seafood flavor and spray drying the resulting mixture.

12. An edible composition produced by the process of claim 11.

13. An edible composition comprising the product produced by intimately admixing (1) a material selected from the group consisting of a seafood extract, an algae extract, a seashell extract and an enzymatic digest of fish and (2) a sulfur-containing compound selected from the group consisting of a sulfur-containing amino acid, a lower alkyl mercaptan, a lower alkyl sulfide, a lower alkyl disulfide, hydrogen sulfide and an inorganic sulfur compound having the formula $MS_x$, where M is selected from the group consisting of alkali-metals, alkaline-earth metals and ammonium, and $S_x$ is selected from the group consisting of sulfide and sulfhydrate and heating the resulting mixture for a finite period of time.

14. An edible composition comprising the product produced by intimately admixing (1) a material selected from the group consisting of seafood extract, algae extract, seashell extract, enzymatic digest of fish and (2) a sulfur-containing compound selected from the group consisting of a sulfur-containing amino acid, a lower alkyl mercaptan, a lower alkyl sulfide, a lower alkyl disulfide, hydrogen sulfide, and an inorganic sulfur compound having the formula $MS_x$, where M is selected from the group consisting of alkali-metals, alkaline-earth metals and ammonium, and $S_x$ is selected from the group consisting of sulfide and sulfhydrate, heating the resulting mixture for a finite period of time and then adding to the heated mixture a material selected from the group consisting of solvents, thickeners, carriers, and flavor and aroma-imparting ingredients.

15. An edible composition comprising the product produced by intimately admixing (1) a seafood extract, (2) an acid salt of thiamine, and (3) a compound selected from the group consisting of a sulfur-containing amino acid, a lower alkyl mercaptan, a lower alkyl sulfide, a lower alkyl disulfide, hydrogen sulfide, and an inorganic sulfur compound having the formula $MS_x$, where M is selected from the group consisting of alkali-metals, alkaline-earth metals, an ammonium, and $S_x$ is selected from the group consisting of sulfide and sulfhydrate and heating the resulting mixture for a finite period of time.

16. The edible composition of claim 15, wherein the heating step carried out in order to produce said composition comprises refluxing the resulting mixture for a period of from about 3 hours up to about 5 hours at atmospheric pressure.

* * * * *